(Model.)

J. L. BORSCH.
Spectacle Frame.

No. 238,274.                    Patented March 1, 1881.

Fig.3.                    Fig.4.

Attest.

Sidney P. Hollingsworth
W<sup>m</sup> Turner

Inventor:
John L. Borsch
per T. J. W. Robertson
Atty.

N. PETERS, PHOTO-LITHOGRAPHER, WASHINGTON, D. C.

UNITED STATES PATENT OFFICE.

JOHN L. BORSCH, OF PHILADELPHIA, PENNSYLVANIA.

SPECTACLE-FRAME.

SPECIFICATION forming part of Letters Patent No. 238,274, dated March 1, 1881.

Application filed November 23, 1880. (Model.)

*To all whom it may concern:*

Be it known that I, JOHN L. BORSCH, a citizen of the United States, residing at Philadelphia, in the county of Philadelphia and State of Pennsylvania, have invented certain new and useful Improvements in Spectacles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
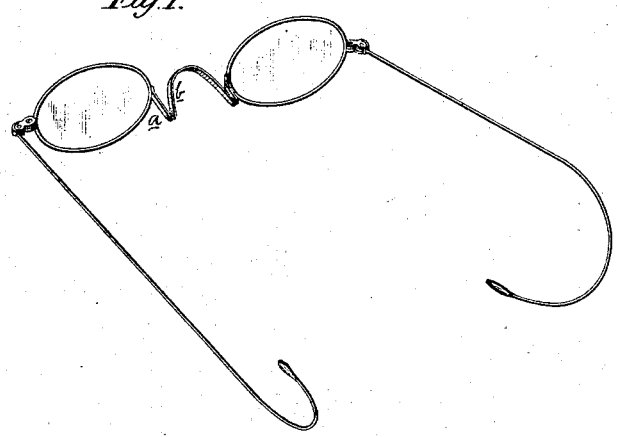
Figure 2:
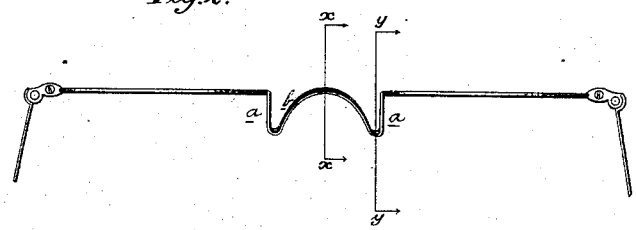
Figure 2:
Figure 2:

In the drawings, Figure 1 is a perspective view of a pair of spectacles constructed according to my improvements; Fig. 2, a top view of the same; Fig. 3, a section through the line $x$ $x$, and Fig. 4 a section through the line $y$ $y$.

My invention relates to the bridge-piece of spectacles; and it consists in a peculiar construction of the same, whereby it can not only be readily made to fit any size nose, but the lens-frames can be adjusted to suit the distance the eyes are apart.

Heretofore it has been necessary in first-class optical establishments to keep on hand a large number of different styles of frames, to suit the great variety of shapes of noses and the difference in the distance the eyes are apart in different persons, and especially is this the case where spectacles are made to remedy the defects caused by astigmatism.

In all cases, whether the eyes are simply weakened by age or over use, or are defective originally, it is of the greatest importance that the center of the pupils of the eyes and the optical center of the lenses correspond, as otherwise the good effects of wearing spectacles are to a considerable extent lost; and as the ordinary bridge-piece frequently makes the nose sore, especially in persons having a delicate skin, it is important for the comfort of the wearer that it should fit the nose.

By my invention both of these desirable features can be readily attained, and by the aid of two sizes of frames (one for distance and the other for near work) any nose can be fitted and the lenses made to correspond to the position of the eyes, notwithstanding the great variations in the distance they are apart in different persons; whereas in those optical establishments where attention is paid to these points in providing their patrons with spectacles, it is necessary now to keep a very large assortment of different-sized frames to accommodate all.

To enable me to accomplish these desirable results I make the bridge-piece in the manner shown in the drawings—that is to say, somewhat in the form of a W, with the center point curved and the outside strokes perpendicular. The parts corresponding to the outside strokes of the W, I call the "adjusting-bars," (marked $a$ in the drawings,) and are attached to the inner ends of the ovals of the lens-frames in such a manner as to be situated in a plane at right angles to the plane of the lens, as shown in Fig. 2, but inclined downward toward the face of the wearer, as shown at $a$ in Figs. 3 and 4, at about an angle of forty degrees with the lens-frames, instead of attaching them so as to range in line with the lenses, as usual. From the ends of the part marked $a$ the bridge-piece is "returned" toward the center of the space between the lens-frames with an upward tendency, so as to form an angle of about sixty degrees with the frame of the lens, as shown at $b$ in Fig. 3, being of course bent to fit the shape of the nose.

If the spectacles are intended for near work, the curved part $b$ of the bridge should be made to extend a little farther upward than in spectacles for distance use. The shape and position of this bridge-piece has many advantages. It can be made of flattened or half-round wire, and, being set at a peculiar angle to the lens-frames, allows of the flattened portion resting against the bridge of the nose, and it can be readily fitted to the shape of the nose. Owing to the much greater length of the wire of which the piece is formed, it can be made to extend down on each side of the nose toward the base, and, being inclined from the face to meet the angle of the nose, thus rests on more of the surface of the skin, which prevents the cutting of the bridge of the nose caused by the usual form of bridge-piece, and holds the front of the spectacles steadily in its position on the face, thus preventing the spectacles from wabbling from side to side, as with all other forms of bridges. The main advantage of my improvement, however, consists in the ease with which the optical centers of the lenses and the pupils of the eyes of the wearer can be made to correspond. Owing to the length of the wire of the bridge-piece, the curved part b, coming in contact with the nose, can be readily bent to fit it, and afterward, by bending the adjusting-bars a a, the centers of the lenses and the pupils of the eyes can be made to correspond, the movement of the lens-frames to adjust the lenses being greatly facilitated by placing the adjusting-bars in a plane at right angles to the lens-frames.

I am aware that bridge-pieces have been made with their ends parallel with the plane of the lenses, and then bent slightly inward or toward the face, so as to hold the lenses away from the eyes; but such spectacles are not adapted to fit down on each side of the nose nearly to the base, as mine are, nor can the ends of the bridge-piece be readily bent, so as to change the distances of the optical centers of the lenses, to make them correspond with the centers of the pupils of the eyes of the wearer.

What I claim as new is—

1. In spectacle-frames, the portion between the lenses consisting of a metallic bar, constituting the nose-piece, and a pair of adjusting-bars, the former adapted to fit the sides of the nose, and the latter secured to the lens-frames and lying in a plane at right angles thereto, or nearly so, and adapted, by bending, to adjust the distance between the lenses to conform to the eyes of the wearer, substantially as described.

2. In spectacle-frames, the portion between the lenses consisting of a single bar of metal, to constitute the nose-piece, and a pair of adjusting-bars, the former having its flattened surface parallel with the surface of the nose and adapted to fit its sides, and the latter secured to the lens-frames and lying in a plane at right angles thereto, or nearly so, but bent downward as they recede from the frames, and adapted, by bending, to adjust the distance between the lenses to conform to the eyes of the wearer, substantially as and for the purpose specified.

In testimony whereof I affix my signature in presence of two witnesses.

JOHN L. BORSCH.

Witnesses:
JACOB A. SCHANDEIN,
WM. C. WIMER.